United States Patent
Yang

(10) Patent No.: US 10,250,669 B2
(45) Date of Patent: Apr. 2, 2019

(54) FILE TRANSFERRING METHOD AN DEVICE THROUGH WI-FI DIRECT

(71) Applicant: ZTE CORPORATION, Shenzhen, Guangdong (CN)

(72) Inventor: Hui Yang, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 181 days.

(21) Appl. No.: 14/439,766

(22) PCT Filed: Jun. 21, 2013

(86) PCT No.: PCT/CN2013/077638
§ 371 (c)(1),
(2) Date: Apr. 30, 2015

(87) PCT Pub. No.: WO2013/182088
PCT Pub. Date: Dec. 12, 2013

(65) Prior Publication Data
US 2015/0295995 A1    Oct. 15, 2015

(30) Foreign Application Priority Data

Oct. 30, 2012 (CN) .......................... 2012 1 0424002

(51) Int. Cl.
*H04L 29/08* (2006.01)
*H04W 8/22* (2009.01)
(Continued)

(52) U.S. Cl.
CPC .............. *H04L 67/06* (2013.01); *H04L 67/10* (2013.01); *H04W 4/18* (2013.01); *H04W 8/00* (2013.01);
(Continued)

(58) Field of Classification Search
CPC . H04W 40/24; H04W 36/0011; H04W 76/14; H04L 67/16; H04L 67/2842;
(Continued)

(56) References Cited

U.S. PATENT DOCUMENTS

2006/0026638 A1* 2/2006 Stark ................. G06F 17/30861
725/38
2007/0266099 A1* 11/2007 Wang ................ H04L 29/12047
709/206
(Continued)

FOREIGN PATENT DOCUMENTS

| CN | 101222521 A | 7/2008 |
| CN | 102497221 A | 6/2012 |

(Continued)

OTHER PUBLICATIONS

Extended European Search Report dated Sep. 24, 2015, Application No. 13801088.9-1854 / 2903329, Applicant ZTE Corporation, 11 pages.

(Continued)

*Primary Examiner* — Ranodhi Serrao
*Assistant Examiner* — James N Fiorillo
(74) *Attorney, Agent, or Firm* — Plumsea Law Group, LLC

(57) ABSTRACT

A method for transferring files and apparatus through Wi-Fi Direct are provided. The method includes: an obtaining step, for obtaining a multimedia attribute of a file to be transferred; a sending step, for sending the multimedia attribute obtained in the obtaining step; a receiving step, for receiving information of the multimedia attribute of the file to be transferred; and a judgment step, for judging, according to the information of the multimedia attribute received in the receiving step, whether a receiving end supports the type of the file to be transferred. The embodiment of the patent (Continued)

document solves the problem that the receiving end may know whether to support the type of the file only after completely receiving the file or performing an opening operation, thus leading to inconvenient use, which improves the user experience.

6 Claims, 4 Drawing Sheets

(51) Int. Cl.
*H04W 4/18* (2009.01)
*H04W 8/00* (2009.01)
*H04N 21/2343* (2011.01)
*H04N 21/422* (2011.01)
*H04N 21/41* (2011.01)
*H04W 76/14* (2018.01)

(52) U.S. Cl.
CPC .......... *H04W 8/22* (2013.01); *H04N 21/2343* (2013.01); *H04N 21/4122* (2013.01); *H04N 21/422* (2013.01); *H04W 76/14* (2018.02)

(58) Field of Classification Search
CPC .. H04L 67/06; H04N 21/422; H04N 21/2343; H04N 21/4122; H04N 21/414
USPC .......................... 709/217, 219; 370/231, 338
See application file for complete search history.

(56) References Cited

U.S. PATENT DOCUMENTS

| | | | | |
|---|---|---|---|---|
| 2010/0125586 A1* | 5/2010 | Van Vleck | ........ | G06F 17/30038 707/748 |
| 2011/0065424 A1* | 3/2011 | Estevez | ................. | H04W 48/18 455/414.3 |
| 2012/0036048 A1* | 2/2012 | Robb | ..................... | G06Q 30/02 705/27.2 |
| 2013/0067107 A1* | 3/2013 | Klemets | ............... | H04N 21/632 709/231 |
| 2013/0204962 A1* | 8/2013 | Estevez | ................. | H04N 7/185 709/217 |
| 2014/0044114 A1* | 2/2014 | Lee | ........................ | H04W 76/14 370/338 |
| 2014/0219088 A1* | 8/2014 | Oyman | ............ | H04N 21/23439 370/231 |
| 2014/0282636 A1* | 9/2014 | Petander | .......... | H04N 21/41407 725/1 |
| 2014/0295765 A1 | 10/2014 | Wei et al. | | |
| 2015/0046837 A1 | 2/2015 | Chen | | |

FOREIGN PATENT DOCUMENTS

| | | |
|---|---|---|
| CN | 102707880 A | 10/2012 |
| CN | 102710872 A | 10/2012 |
| CN | 102711175 A | 10/2012 |
| EP | 2487963 A2 | 8/2012 |
| EP | 2696643 A2 | 2/2014 |
| EP | 2793528 A1 | 10/2014 |
| EP | 2843523 A1 | 3/2015 |
| WO | 2012115385 A2 | 8/2012 |

OTHER PUBLICATIONS

PCT International Search Report dated Oct. 3, 2013, Application No. PCT/CN2013/077638, 3 Pages.

* cited by examiner

FILE TRANSFERRING METHOD AN DEVICE THROUGH WI-FI DIRECT

CROSS-REFERENCE TO RELATED APPLICATIONS

This application is a U.S. national phase of PCT Application No. PCT/CN2013/077638 filed Jun. 21, 2013, which claims priority to Chinese Application No. 201210424002.4 filed Oct. 30, 2012, the disclosures of which are incorporated in their entirety by reference herein.

TECHNICAL FIELD

The patent document relates to the file transferring field, and in particular, to a method for transferring files through Wi-Fi Direct, an apparatus for realizing the above-mentioned method, and a file transferring system.

BACKGROUND OF THE RELATED ART

With the gradual popularization of the intellectual mobile phone and the constant development of the Wireless Fidelity (Wi-Fi) technology, the price of mobile phone drops gradually and the function is stronger gradually, and the increasing mobile phones have possessed the mass storage function and the Wi-Fi Direct communication function, and the mobile phone becomes the important communication means in people daily life. The function of the mobile phone is strengthened day by day, which provides the foundation for the innovation of the mobile phone multimedia application. At present, besides the voice communication, the mobile phone also has the mass storage function and the Wi-Fi Direct communication function. Most mobile phones have dozens of mega storage space, while after the mobile phone is inserted with the extra storage card, the storage space can even reach 1 G, 2 G or bigger.

The Wi-Fi Direct technology can realize the direct interconnection of the Wi-Fi devices. The products with the Wi-Fi CERTIFIED Wi-Fi Direct sign can be interconnected without joining the traditional family, official working or hot spot network. By using this kind of technology, the mobile phone, the camera, the printer, the PC and the game device can be directly interconnected, to realize the sharing of the contents. The Wi-Fi Direct devices can realize one-to-one connection, and also can be connected to multiple devices.

The mobile phones supporting the Wi-Fi Direct technology can perform the exchange of file data through the Wi-Fi Direct, and now the transmission mode of the Wi-Fi Direct is that, the sender selects the file for sending at first, the receiver receives the file, and after the file is transferred completely, the receiver can open this file and browse the content of this file.

However, when the multimedia attribute of the transferred file is not supported by the receiver, that is to say, the receiver is unable to open the file finally, so the work done before is shown as wasted, for example, the opposite side transferred a video file with 500M, and after going through a relatively long-time file transferring operation, when the receiver selects to open the file and browse the video, it is prompted that the file does not belong to the supported type and then it is unable to be opened. This kind of operating method is obviously worse in the user experience.

Aiming at the problem that the terminal may know whether the type of the file is supported only after completely receiving the file or performing an opening operation when the user receives the file by using the Wi-Fi Direct, thus leading to inconvenient use and poor user experience, in the related art, the effective solution is not proposed at present.

SUMMARY

An embodiment of the patent document provides a method and apparatus for transferring files through Wireless Fidelity (Wi-Fi) Direct, to solve the problem that the receiving end may know whether the type of the file is supported only after completely receiving the file or performing an opening operation when the user receives the file by using the Wi-Fi Direct, thus leading to inconvenient use and poor user experience in the background of the related art.

According to one aspect of the embodiment of the patent document, a method for sending files through Wireless Fidelity (Wi-Fi) Direct is provided, comprising: a transmitting end obtaining a multimedia attribute of a file to be transferred; the transmitting end sending the obtained multimedia attribute; wherein the multimedia attribute comprises: information for a receiving end to judge whether the file to be transferred is supported.

Alternatively, the step of sending the obtained multimedia attribute comprises:
the transmitting end encapsulating the multimedia attribute into an independent data packet, and sending the data packet.

Alternatively, the step of sending the obtained multimedia attribute comprises:
the transmitting end carrying the multimedia attribute of the file to be transferred in exchanged data, and transferring the multimedia attribute when the transmitting end and the receiving end perform exchanging.

According to another aspect of the embodiment of the patent document, a method for receiving files through Wireless Fidelity (Wi-Fi) Direct is provided, comprising: a receiving end receiving information carrying a multimedia attribute of a file to be transferred; and the receiving end judging whether the receiving end supports the type of the file to be transferred through the received information carrying the multimedia attribute.

Alternatively, the method further comprises:
the receiving end prompting a user according to a judgment result of the step of judging whether the receiving end supports the type of the file to be transferred.

Alternatively, the step of prompting the users comprises:
if the receiving end supports the type of the file to be transferred, then continuing the transferring of the file to be transferred;
if the receiving end does not support the type of the file to be transferred, then sending a prompt for selecting whether to continue receiving the file or not to the user; if the user selects to continue receiving the file, then continuing the transferring of the file to be transferred; and if the user selects not to continue receiving the file, then stopping the transferring operation of the file to be transferred.

Alternatively, the step of judging whether the receiving end supports the type of the file to be transferred comprises:
checking a multimedia supporting capability list supported by the receiving end;
if the multimedia attribute of the file to be transferred is in the list, then indicating that the receiving end supports the type of the file to be transferred;
if the multimedia attribute of the file to be transferred is not in the list, then indicating that the receiving end does not support the type of the file to be transferred.

According to one more aspect of the embodiment of the patent document, an obtaining step, for obtaining a multimedia attribute of a file to be transferred; a sending step, for sending the multimedia attribute obtained in the obtaining step; a receiving step, for receiving information of the multimedia attribute of the file to be transferred; and a judgment step, for judging, according to information of the multimedia attribute received in the receiving step, whether a receiving end supports the type of the file to be transferred.

At the same time, according to one aspect of the embodiment of the patent document, an apparatus for sending files through Wireless Fidelity (Wi-Fi) Direct is provided, comprising: an obtaining module, which is configured to: obtain a multimedia attribute of a file to be transferred; and a transmitting module which is connected to the obtaining module and is configured to: send the multimedia attribute obtained by the obtaining module to a receiving end; wherein the multimedia attribute comprises: information for the receiving end to judge whether to support the file to be transferred.

According to another aspect of the embodiment of the patent document, an apparatus for receiving files through Wireless Fidelity (Wi-Fi) Direct is provided, comprising: a receiving module, which is configured to: receive information carrying a multimedia attribute of a file to be transferred; and a judgment module which is connected to the receiving module and is configured to: judge whether the apparatus for receiving files supports the type of the file to be transferred through the information carrying the multimedia attribute received by the receiving module; wherein the multimedia attribute comprises: information for the judgment module to judge whether to support the file to be transferred.

Alternatively, the judgment module is configured to: check whether the multimedia attribute of the file to be transferred is in a multimedia capability list supported by the apparatus for receiving files, and determining whether to continue receiving the file or send prompt information to a user according to a judgment result.

Alternatively, the apparatus further comprises:

a prompting module, which is configured to: prompt a user according to the judgment result of the judgment module.

Through the embodiment of the patent document, the transmitting end sends the file multimedia attribute of the file to be transferred to the receiving end, and the receiving end receives the file multimedia attribute of the file to be transferred which is transferred through the Wi-Fi Direct this time. The transmitting end is made to inform the file multimedia attribute of the file to be transferred to the receiving end in advance, which guarantees that the receiving end can know the file multimedia attribute of the file to be transferred before receiving the file to be transferred and then can judge whether the type of file is supported by itself. The problem that the receiving end may know whether to support the type of the file only after completely receiving the file or performing an opening operation and thus leading to inconvenient use is solved, and the user experience is improved.

EMBODIMENTS OF THE PATENT DOCUMENT

Figure 1:
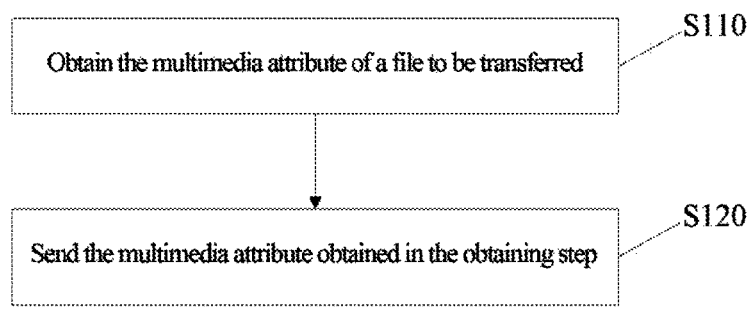
FIG. 1 is a flow chart of a method for sending files according to an embodiment of the patent document.

The embodiment of the patent document provides a method for sending files. FIG. 1 is a flow chart of the method for sending files according to the embodiment of the patent document, as shown in FIG. 1, including the following steps.

In an obtaining step S110, a transmitting end obtains the file multimedia attribute of a file to be transferred.

In a sending step S120, the transmitting end sends the file multimedia attribute of the file to be transferred to the receiving end.

The transmitting end sends the file multimedia attribute to the receiving end, which can have many ways for sending, for example, carrying the file multimedia attribute in the signaling or message exchanged by the transmitting end and the receiving end, taking the multimedia attribute as a plurality of fields and appending them in any existing protocol data unit (PDU) used for exchange, and transferring the multimedia attribute during the exchange; or defining the specialized data packet between the transmitting end and the receiving end for sending, wherein the data packet encapsulates the multimedia attribute.

The multimedia attribute sent by the transmitting end is that: the receiving end can obtain the corresponding information to judge whether to support the file by itself after receiving the content of information, and the meaning of supporting herein includes but not limited to opening operation and browsing the content of the file.

For example, for the video file, the multimedia attribute may include (but not limited to) the following contents: the display resolution, the length, the video coding, the frame rate, and the audio sampling rate, coding, etc.; for the audio file, the multimedia attribute may include (but not limited to) the following contents: the bit rate, the sampling rate, the audio coding, etc.; for the picture information, the media attribute may include (but not limited to) the following contents: the coding format of the picture, the type of picture, etc.

There is the difference within the multimedia supporting capabilities of different terminals, and also there is the difference on judging whether to support the multimedia file, so, in the specific realization, every mode of transferring the multimedia attribute in advance to make the receiving end judge whether to support the file can be included in the spirit of the patent document, no matter what multimedia attributes are sent specifically.

Figure 2:
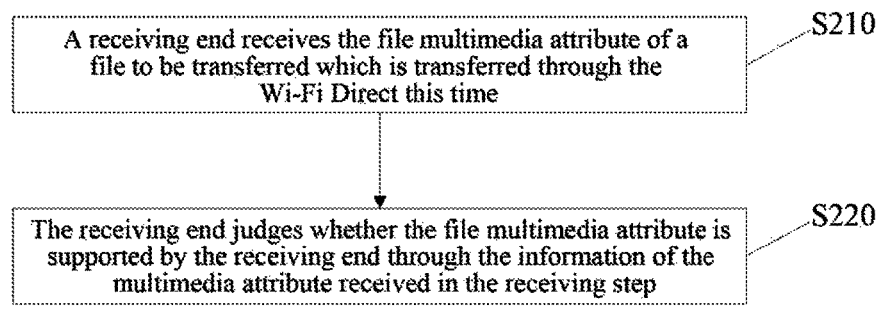
FIG. 2 is a flow chart of a method for receiving files according to an embodiment of the patent document.

The embodiment of the patent document further provides a method for receiving files. FIG. 2 is a flow chart of a method for receiving files according to an embodiment of the patent document, as shown in FIG. 2, including the following steps.

In a receiving step S210, a receiving end receives information carrying a file multimedia attribute of a file to be transferred which is transferred through the Wi-Fi Direct this time.

In a judgment step S220, the receiving end judges whether the multimedia attribute of the file is supported by the receiving end through the information carrying the multimedia attribute received in the receiving step, that is, whether the receiving end supports the type of the file to be transferred.

The receiving method of the above-mentioned file further includes: a prompt step, for providing a corresponding prompt to the user according to the judgment result of the judgment step.

The receiving end provides the corresponding prompt to the user according to the judgment result by using the following method: the receiving end receives the file multimedia attribute of the file to be transferred which is transferred through the Wi-Fi Direct this time, checks the multimedia capability list supported by itself, and checks whether the file multimedia attribute is in the multimedia supporting capability list; if yes, the receiving end supports the type of file, then the file transferring continues; if not, the receiving end does not support the type of file, then "the type of file is not supported by the receiving end, whether to continue receiving the file?" is prompted to the user, and the selection right is delivered to the user.

Figure 3:
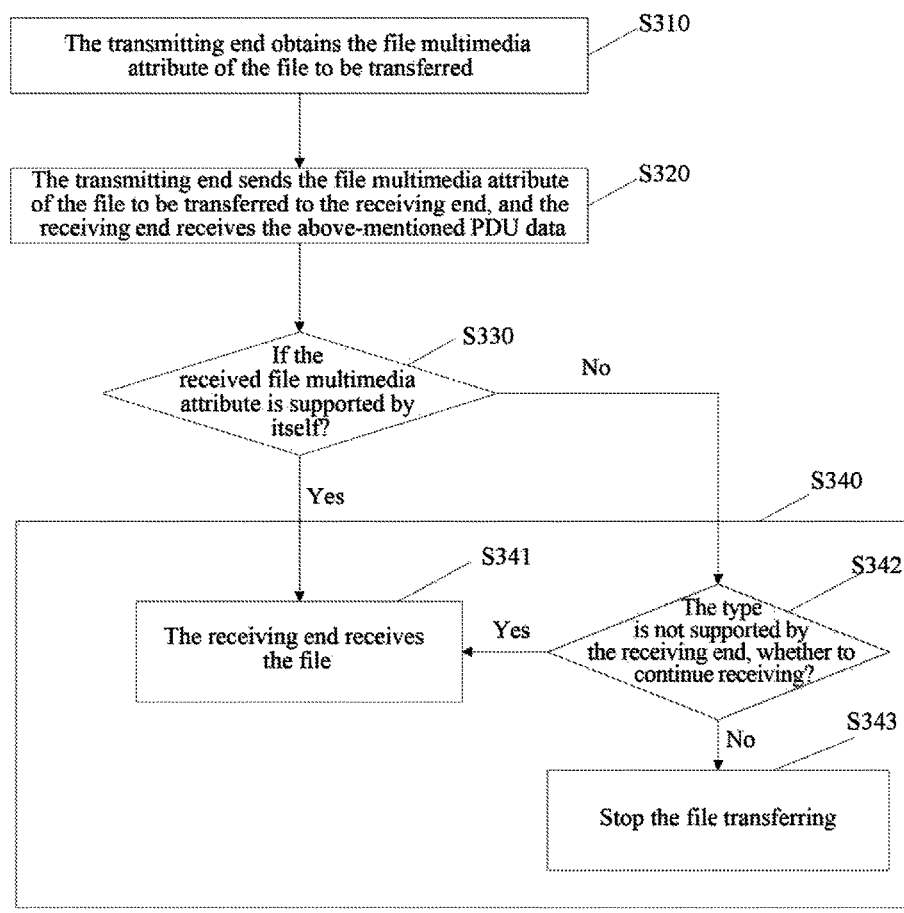
FIG. 3 is a flow chart of a method for transferring files according to an embodiment of the patent document.

The embodiment of the patent document further provides a method for transferring files. FIG. 3 is a flow chart of the method for transferring files according to the embodiment of the patent document, as shown in FIG. 3, including the following steps.

In the obtaining step S310, the transmitting end obtains the file multimedia attribute of the file to be transferred. Specifically, it is adopted to append it in the existing protocol data unit (PDU) used for exchange or to encapsulate it into one dedicated data packet independently, for example, in the protocol data unit (PDU) used for exchange. The multimedia attribute includes: the information used for judging whether the receiving end supports the file to be transferred.

In the sending step S320, the transmitting end sends the file multimedia attribute of the file to be transferred to the receiving end, and the receiving end receives the above-mentioned PDU data.

In the judgment step S330, the receiving end judges whether the multimedia attribute of the received file is supported by itself, which can be realized by searching its own multimedia supporting capability list.

In the prompt step S340, according to the judgment result of the judgment step, the corresponding prompt is provided to the user. If the type of file is supported, then the step S341 is executed to continue the transferring of the file, thus enabling the receiving end to receive the file normally; if the type of file is not supported, then the step S342 is executed to provide the relevant prompt to the user: "the type of file is not supported by receiving end, whether to continue receiving the file?", and the user makes the determination; if it is selected to continue, then the step S341 is executed to continue the transferring of the file and complete the receiving of the file; if it is selected to deny (that is, not continue), then the step S343 is executed to give up receiving the file and stop the file transferring operation, and thus the above-mentioned transferring procedure is ended.

Figure 4:
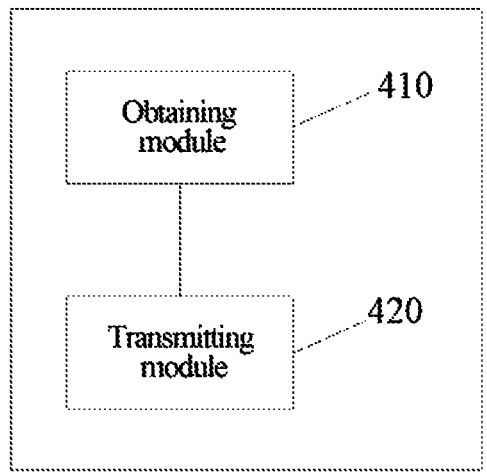
FIG. 4 is a structural block diagram of an apparatus for sending files according to an embodiment of the patent document.

The embodiment of the patent document provides an apparatus for sending files which can be used for realizing the above-mentioned method for sending files. FIG. 4 is a structural block diagram of the apparatus for sending files according to the embodiment of the patent document. The apparatus for sending files 400 includes an obtaining module 410 and a transmitting module 420. The obtaining module 410 is configured to: obtain the file multimedia attribute of a file to be transferred; and the transmitting module 420 is connected to the obtaining module and configured to: send the file multimedia attribute of the file to be transferred to a receiving end; wherein the multimedia attribute includes: information for judging whether the file to be transferred is supported by the receiving end.

Figure 5:
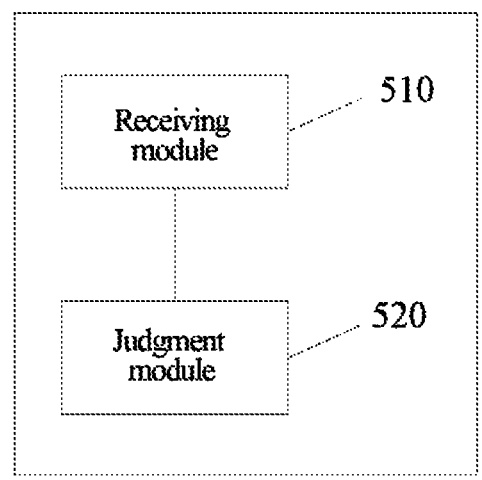
FIG. 5 is a structural block diagram of an apparatus for receiving files according to an embodiment of the patent document.

The embodiment of the patent document provides an apparatus for receiving files which can be used for realizing the above-mentioned method for receiving files. FIG. 5 is a structural block diagram of the apparatus for receiving files 500 according to the embodiment of the patent document, including a receiving module 510 and a judgment module 520. The receiving module 510 is configured to: receive the file multimedia attribute of the file to be transferred which is transferred through the Wi-Fi Direct this time; and the judgment module 520 is connected to the receiving module and configured to: judge whether the apparatus for receiving files supports the type of the file to be transferred through the information carrying the multimedia attribute received by the receiving module; wherein the multimedia attribute includes: information for the judgment module to judge whether to support the file to be transferred.

The above-mentioned judgment module is configured to: check whether the multimedia attribute of the file to be transferred is in a multimedia capability list supported by the apparatus for receiving files, and determine whether to continue receiving the file or send prompt information to a user according to a judgment result. So, the judgment module can determine to continue the file receiving process or to feed back the corresponding prompt to the user by utilizing the prompting module (not shown in the figure) according to the judgment result.

Figure 6:
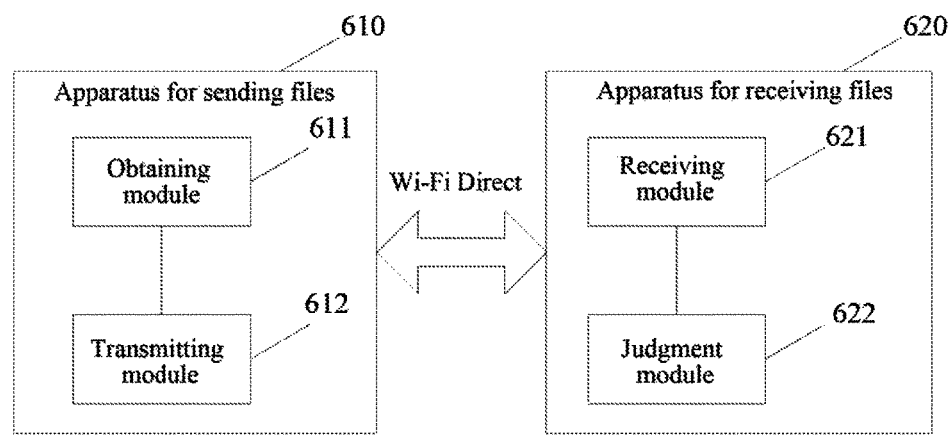
FIG. 6 is a structural block diagram of a system for transferring files according to an embodiment of the patent document.

The embodiment of the patent document further provides a system for transferring files, and the system includes an apparatus for sending files and an apparatus for receiving files, and the two perform the file transferring through the wireless communication means of the Wi-Fi Direct. FIG. 6 is a structural block diagram of the system for transferring files of the embodiment of the patent document, including the apparatus for sending files 610 and the apparatus for receiving files 620, wherein the apparatus for sending files 610 includes the obtaining module 611 and the transmitting module 612, and the apparatus for receiving files 620 includes the receiving module 621 and the judgment module 622.

For the apparatus for sending files 610, the obtaining module 611 is configured to: obtain the file multimedia attribute of the file to be transferred; and the transmitting module 612 is connected to the obtaining module 611 and configured to: send the file multimedia attribute of the file to be transferred to the receiving end; wherein the multimedia attribute includes: the information for judging whether the receiving end supports the file to be transferred.

For the apparatus for receiving files 620, the receiving module 621 is configured to: receive the file multimedia attribute of the file to be transferred which is transferred through the Wi-Fi Direct this time; and the judgment module 622 is connected to the receiving module 621 and configured to: judge whether the file multimedia attribute is supported by the receiving end; wherein the multimedia attribute includes: the information for judging whether the receiving end supports the file to be transferred.

The above-mentioned judgment module 622 is configured to: check whether the multimedia attribute of the file to be transferred is in the multimedia capability list supported by the receiving end, and determine whether to continue receiving the file or send prompt information to the user according to the judgment result. So, the judgment module can determine to continue the file receiving process or to feed back the corresponding prompt to the user by utilizing the prompting module (not shown in the figure) according to the judgment result.

By adopting the method and apparatus provided by the embodiment of the patent document, compared with the related art, obvious progress have been made, and it can be judged whether the file multimedia attribute is supported by the receiving end in advance before the file is received through the Wi-Fi Direct, which avoids the problem that the terminal can know whether to support the type of the file only after completely receiving the file or performing an opening operation when the user uses Wi-Fi Direct to receive the file, thus leading to inconvenient use and poor user experience.

The above description is only the preferred embodiments of the patent document and is not intended to limit the patent document. For those skilled in the art, the patent document can have various modifications and variations. All of modifications, equivalents and/or variations without departing from the spirit and essence of the patent document should be included in the protection scope of the patent document.

INDUSTRIAL APPLICABILITY

The embodiment of the patent document solves the problem that the receiving end may know whether to support the type of the file only after completely receiving the file or performing an opening operation, thus leading to inconvenient use, which improves the user experience.

I claim:

1. A method for sending files through Wireless Fidelity (Wi-Fi) Direct, comprising:
    obtaining, by a transmitting end, a multimedia attribute of a file to be transferred after the file to be transferred is determined to be transferred to a receiving end; and
    sending, by the transmitting end, the obtained multimedia attribute before sending the file to be transferred to the receiving end,
    wherein the multimedia attribute indicates the receiving end to judge whether to support the file to be transferred,
    wherein if the multimedia attribute of the file to be transferred is in a supporting capability list supported by the receiving end, it is indicated that the type of the file to be transferred is supported by the receiving end;
    if the multimedia attribute of the file to be transferred is not in the supporting capability list supported by the receiving end, it is indicated that, the type of the file to be transferred is not supported by the receiving end;
    wherein the multimedia attribute of the file:
    includes content that describes the type of file being transferred and at least one or more operational requirements for processing the file on the receiving end;
    is carried in a signaling or message exchange between the transmitting end and the receiving end, and the multimedia attribute of the file is taken as a plurality of fields and appended in any existing protocol data unit (PDU) used for exchange; and
    is transferred by the message exchange between the transmitting end and the receiving end;
    wherein the supporting capability list describes one or more types of files supported by the receiving end and at least one or more operational capabilities required for processing the file on the receiving end.

2. The method for sending files according to claim 1, wherein the step of sending, by the transmitting end, the obtained multimedia attribute comprises:
    encapsulating the multimedia attribute into an independent data packet and sending the data packet by the transmitting end.

3. The method for sending files according to claim 1, wherein the step of sending the obtained multimedia attribute comprises:
    carrying, by the transmitting end, the multimedia attribute of the file to be transferred in exchanged data, and transferring the multimedia attribute when the transmitting end and the receiving end perform exchanging.

4. A method for receiving files through Wireless Fidelity (Wi-Fi) Direct, comprising:
    receiving, by a receiving end, information carrying a multimedia attribute of a file to be transferred after the file to be transferred is determined to be transferred by the transferring end; and
    judging, by the receiving end, whether the receiving end supports the type of the file to be transferred through the received information carrying the multimedia attribute before receiving the file to be transferred from the transmitting end;
    wherein the step of judging, by the receiving end, whether the receiving end supports the type of the file to be transferred through the received information carrying the multimedia attribute comprises:
    checking a multimedia supporting capability list supported by the receiving end;
    if the multimedia attribute of the file to be transferred is in the list indicating that the receiving end supports the type of the file to be transferred;
    if the multimedia attribute of the file to be transferred is not in the list indicating that the receiving end does not support the type of the file to be transferred;
    wherein the multimedia attribute of the file:
    includes content that describes the type of file being transferred and at least one or more operational requirements for processing the file on the receiving end;
    is carried in a signaling or message exchange between the transmitting end and the receiving end and the multimedia attribute of the file is taken as a plurality of fields and appended in any existing protocol data unit (PDU) used for exchange; and
    is transferred by the message exchange between the transmitting end and the receiving end;
    wherein the multimedia supporting capability list describes one or more types of files supported by the receiving end and at least one or more operational capabilities required for processing the file on the receiving end.

5. A computerized apparatus for sending files through Wireless Fidelity (Wi-Fi) Direct, comprising:
    an obtaining module, which is configured to:
    obtain a multimedia attribute of a file to be transferred after the file to be transferred is determined to be transferred from a transferring end to a receiving end; and
    a transmitting module, which is connected to the obtaining module and is configured to:
    send the multimedia attribute obtained by the obtaining module to the receiving end before sending the file to be transferred to the receiving end,
    wherein the multimedia attribute indicates the receiving end to judge whether to support the file to be transferred, wherein if the multimedia attribute of the file to be transferred is in a supporting capability list supported by the receiving end, it is indicated that the type of the file to be transferred is supported by the receiving end;

if the multimedia attribute of the file to be transferred is not in the supporting capability list supported by the receiving end, it is indicated that the type of the file to be transferred is not supported by the receiving end;

wherein the multimedia attribute of the file includes content that describes the type of file being transferred and at least one or more operational requirements for processing the file on the receiving end;

wherein the supporting capability list describes one or more types of files supported by the receiving end and at least one of more operational capabilities required for processing the file on the receiving end;

wherein the transmitting module is further configured:

to carry the multimedia attribute of the file in a signaling or message exchange between the transmitting end and the receiving end, and take the multimedia attribute of the file as a plurality of fields and appended in any existing protocol data unit (PDU) used for exchange; and to transfer the multimedia attribute by the message exchange between the transmitting end and the receiving end.

6. A computerized apparatus for receiving files through Wireless Fidelity (Wi-Fi) Direct, comprising:

a receiving module, which is configured to:

receive information carrying a multimedia attribute of a file to be transferred after the file to be transferred is determined to be transferred by a transmitting end; and a judgment module, which is connected to the receiving module and is configured to:

judge whether the apparatus for receiving files supports the type of the file to be transferred through the information carrying the multimedia attribute received by the receiving module before receiving the file to be transferred from the transmitting end, wherein the multimedia attribute comprises:

information sent by the transmitting end to the receiving end for the judgment module to judge whether to support the file to be transferred, wherein the multimedia attribute of the file includes content that describes the type of file being transferred and at least one or more operational requirements for processing the file;

wherein the judgment module is further configured to:

check a multimedia supporting capability list supported by the apparatus, wherein the multimedia supporting capability list describes one or more types of files supported by the apparatus and at least one of more operational capabilities required for processing the file;

if the multimedia attribute of the file to be transferred is in the list, indicate that the apparatus supports the type of the file to be transferred;

if the multimedia attribute of the file to be transferred is not in the list indicate that the apparatus does not support the type of the file to be transferred;

wherein the receiving module is further configured to:

receive a signaling or message carrying the multimedia attribute of the file from the transmitting end, and acquire the multimedia attribute of the file which is taken as a plurality of fields and appended in any existing protocol data unit (PDU) used for exchange and transfer the multimedia attribute by a message exchange between the transmitting end and the receiving end.

* * * * *